Nov. 16, 1948.    E. D. LA FLEUR    2,454,186
CRANKPIN GRINDING MACHINE
Filed Dec. 19, 1945    3 Sheets-Sheet 1

Inventor
ELPHEGE D. LAFLEUR
By Harold W. Eaton
Attorney

Nov. 16, 1948.    E. D. LA FLEUR    2,454,186
CRANKPIN GRINDING MACHINE
Filed Dec. 19, 1945    3 Sheets-Sheet 2

Inventor
ELPHEGE D. LaFLEUR
By Harold W. Eaton
Attorney

Nov. 16, 1948.　　　　　E. D. LA FLEUR　　　　　2,454,186
CRANKPIN GRINDING MACHINE
Filed Dec. 19, 1945　　　　　　　　　　　　　3 Sheets-Sheet 3

Inventor
ELPHEGE D. LaFLEUR
By Harold W. Eaton
Attorney

Patented Nov. 16, 1948

2,454,186

UNITED STATES PATENT OFFICE 2,454,186

CRANKPIN GRINDING MACHINE

Elphege D. La Fleur, Lancaster, Mass., assignor to Norton Company, Worcester, Mass., a corporation of Massachusetts Application December 19, 1945, Serial No. 635,883

10 Claims. (Cl. 51—237)

This invention relates to grinding machines, and more particularly to a double head crankpin grinding machine.

One of the objects of this invention is to provide a simple, thoroughly practical, readily controllable crankpin grinding machine. Another object is to provide a crankpin grinding machine with two opposed work heads to support and synchronously rotate the opposite ends of a crankshaft. Another object is to provide work heads having pot chucks which are adjustable in a direction normally to the axis of the spindle axis precisely to set-up pot chucks for grinding crankpins of different throws.

A further object of the invention is to provide a gauge mechanism on each work head precisely to facilitate adjustment of the pot chuck for grinding crankpins of different throws. Another object of the invention is to provide an indexing mechanism for the work head to facilitate a rotary indexing of the pot chuck to position successive crankpins for grinding without unclamping the crankshaft in the pot chucks. Another object is to provide a spring actuated cam to actuate a clamp jaw on the pot chuck to clamp and lock a crankshaft in a position and to provide a hydraulic piston and cylinder to release said clamp jaw.

This invention accordingly consists in the features of construction, combinations of elements, and arrangements of parts as will be exemplified in the structure to be hereinafter described, and the scope of application of which will be indicated in the following claims.

Figure 1:
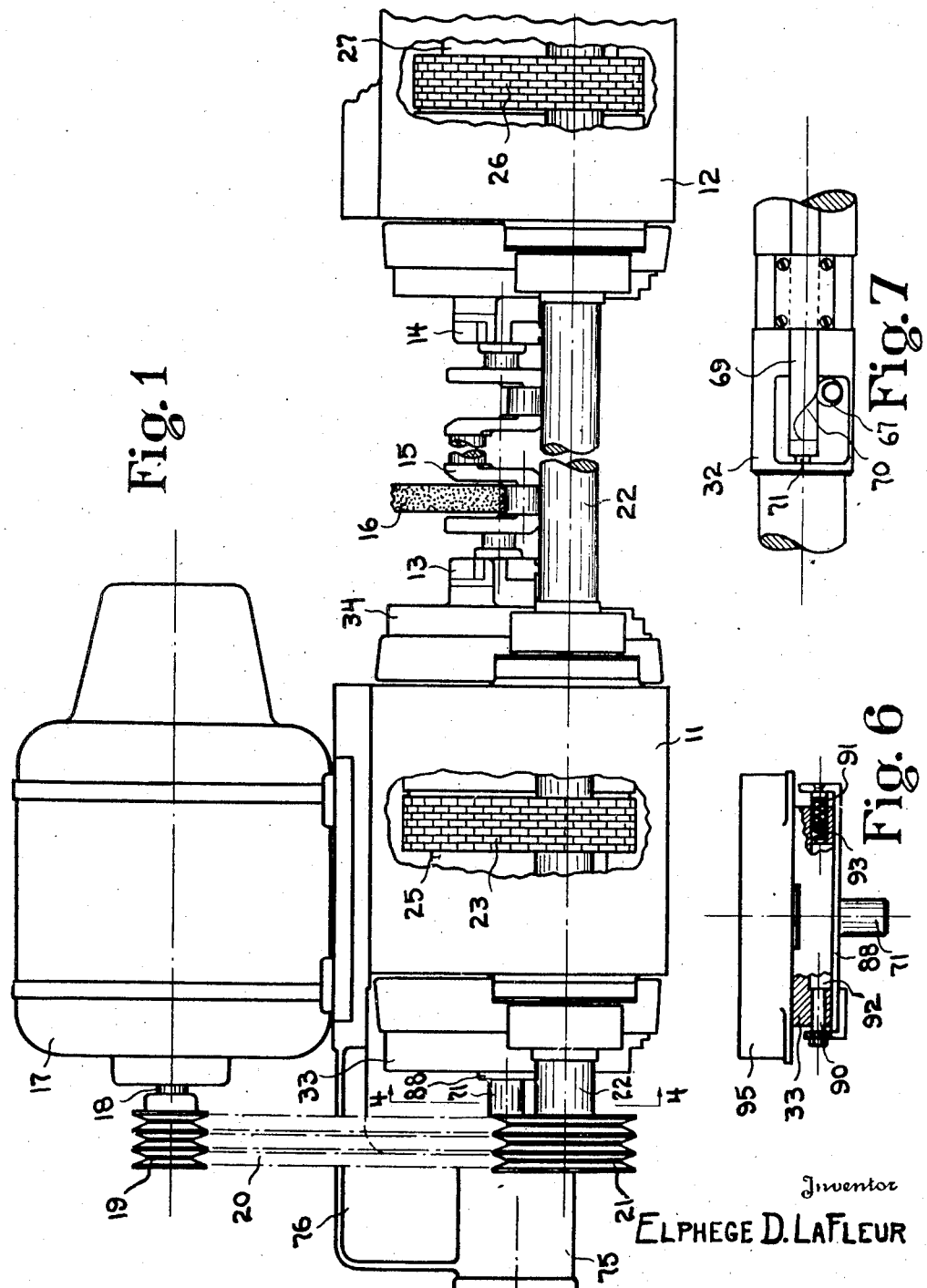
Figure 2:
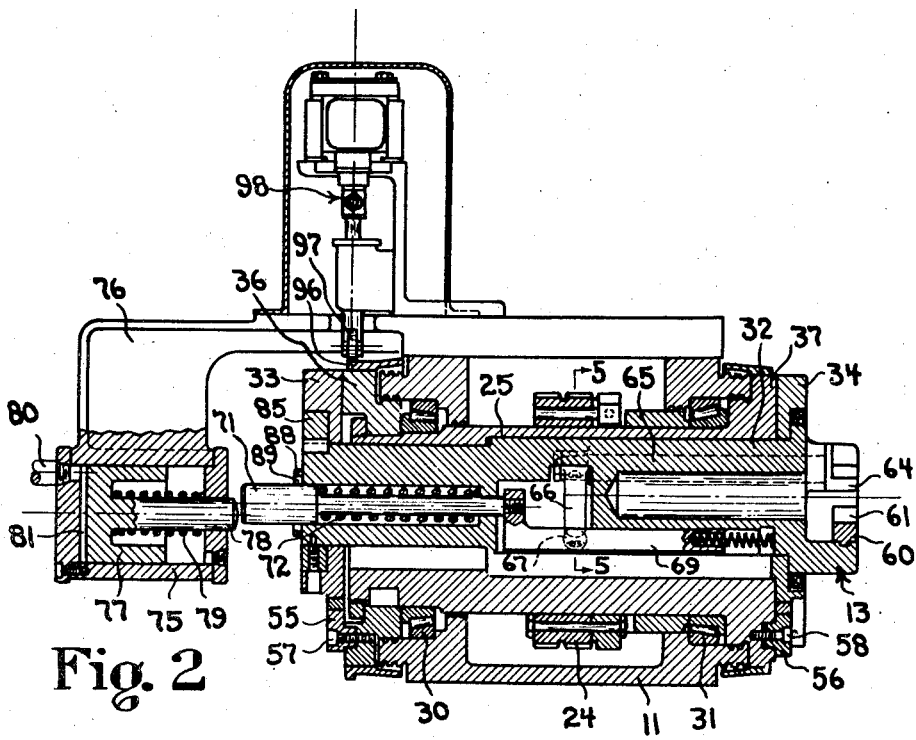
Figure 3:
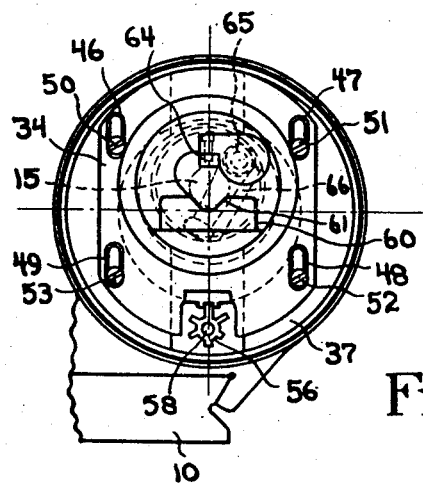
Figure 5:
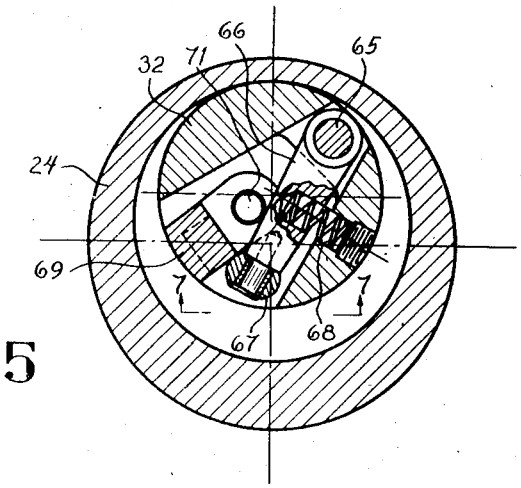
Figure 8:
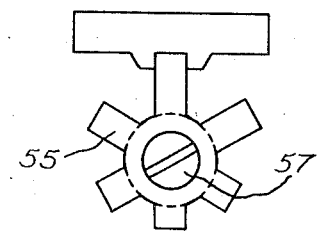
Figure 4:
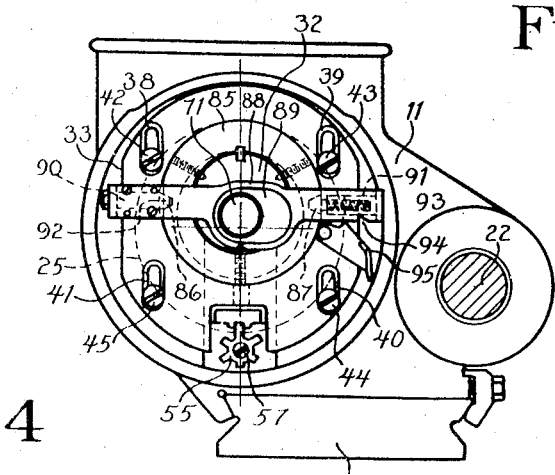

In the accompanying drawings, in which is shown one of the various possible embodiments of the mechanical features of this invention, Fig. 1 is a fragmentary front elevation of a grinding machine embodying the invention, Fig. 2 is a vertical sectional view through the left-hand work head and pot chuck, Fig. 3 is a fragmentary right-hand end elevation of the left-hand work head, showing the pot chuck, Fig. 4 is a fragmentary cross sectional view, taken approximately on the line 4—4 of Fig. 1, showing the chuck indexing mechanism, Fig. 5 is a fragmentary cross sectional view, on an enlarged scale taken approximately on the line 5—5 of Fig. 2, showing the chuck actuating mechanism, Fig. 6 is a fragmentary plan view of the left-hand work head, having parts broken away and shown in sections to illustrate the work index mechanism, Fig. 7 is a fragmentary sectional view on a reduced scale, taken approximately on the line 7—7 of Fig. 5 showing the chuck actuating mechanism, and Fig. 8 is an elevation, and an enlarged scale, of the gauge for adjusting the throw of the pot chucks.

As shown in the drawings a grinding machine has been illustrated having a table 10 which serves as a support for a pair of space aligned work heads 11 and 12 which support a pair of pot chucks 13 and 14 respectively. The pot chucks 13 and 14 serve to support and rotate the opposite end of a crankshaft 15 while the pins of the crankshaft are ground by means of a grinding wheel 16. A driving mechanism is provided for positively and synchronously rotating the pot chucks 13 and 14 comprising an electric motor 17 which is mounted on the work head 11. The motor 17 is provided with an armature shaft 18 which supports a multiple V-groove pulley 19. The pulley 19 is connected by multiple V-belts 20 with a multiple V-groove pulley 21 which is supported on the left-hand end of a rotatably mounted shaft 22 (Fig. 1). The shaft 22 is journaled in suitable bearings (not shown) in the work heads 11 and 12. A sprocket (not shown) on the shaft 22 is connected by means of a link chain 23 with a sprocket 24 which is mounted on a rotatably mounted spindle 25 in the work head 11. The spindle 25 is connected in a manner to be hereinafter described to support and rotate the pot chuck 13.

The driving shaft 22 is similarly provided with a second sprocket (not shown) within the work head 12 which is connected by means of a link chain 26 with a sprocket (not shown) mounted on a rotatably mounted spindle 27 in work head 12. The work heads 11 and 12 are substantially identical in construction, consequently only one of the work heads has been illustrated and described in detail.

As shown in Fig. 2 the spindle 25 is supported by means of a pair of spaced roller bearings 30 and 31 within the work head 11. A sleeve 32 which serves as a support for the pot chuck 13 is rotatably supported by a pair of end plates 33 and 34. The end plate 33 is adjustably mounted on collar 36 which is mounted on left-hand end of the spindle 25. The plate 34 is adjustably mounted on a flange 37 which is preferably formed integral with the spindle 25.

In order to facilitate adjustment of the pot chuck 13 in a direction normal to the axis of rotation of the spindle 25, the plates 33 and 34 are provided with suitable adjusted mechanism so that the pot chuck 13 may be readily adjusted to position a crankshaft having crankpins of a predetermined throw. The plate 33 is provided with plurality of elongated slots 38, 39, 40 and 41. A plurality of clamp screws 42, 43, 44 and 45 pass through the elongated slots 38, 39, 40 and 41, respectively, and are screw threaded into the collar 36. It will be readily apparent from the foregoing disclosure that the plate 33 may be readily adjusted by loosening screws 42, 43, 44 and 45 and then moving the plate 33 into the desired position after which the screws are again tightened to clamp the plate 33 into rigid engagement with the collar 36.

A similar adjusting mechanism is provided for the plate 34. The plate 34 is provided with the plurality of elongated slots 46, 47, 48 and 49. Clamp screws 50, 51, 52 and 53 pass through the elongated slots 46, 47, 48 and 49, respectively, and are screw threaded into the flange 37. It will be readily apparent that by manipulation of the clamp screws above described, the plate 34 may be readily adjusted to the spindle 25 and the flange 37 to facilitate positioning of the pot chuck 13.

In order that sleeve 32 may be readily adjusted so as to position the pot chuck 13 for grinding a crankshaft for predetermined crank throws an adjustable gauge mechanism is provided to facilitate precisely positioning the plates 33 and 34. A gauge block 55 having a plurality of radially projecting gauge arms is rotatably supported by a clamp screw 57 on the collar 36. A similar gauge block 56 is rotatably supported by a clamp screw 58 on the flange 37. The gauge blocks 55 and 56 are shown in detail (Fig. 8). After adjusting the gauge blocks to the desired positions, the gauge blocks are then locked in a position by tightening the clamping screws 57 and 58. The plates 33 and 34 are then adjusted so that a locating surface on the bottom of the plates engages the gauge arm, after which the plates 33 and 34 are clamped in predetermined adjusted positions by tightening the clamping screws. This adjustment serves to position a pot chuck 13 so as to locate the crankshaft for grinding the crankpins thereon. After the desired adjustment has been made on the work head 11, a similar adjustment is made on the work head 12 so as to position the pot chuck 14 relative to the spindle 27 so that both of the pot chucks are located to support and rotate the opposite ends of the crankshaft 15.

The pot chucks 13 and 14 are identical in construction, and consequently only one of the chucks 13 has been illustrated in detail. This chuck comprises a block 60 which is fixedly mounted on a projecting boss on the sleeve 32. The block 60 is provided with a V-shaped surface 61 to support and locate the end of the crankshaft 15. A clamping jaw is provided for clamping the crankshaft 15 into rigid engagement with the V-shaped supporting surface 61. The clamping jaw 64 is mounted on a right-hand end of a rock shaft 65. The rock shaft 65 is rotatably journaled in the sleeve 32. A rock arm 66 (Fig. 2) is mounted on a left-hand end of the rock shaft 65. A spherically shaped roller 67 is mounted on the lower end of the rock arm 66.

A compression spring 68 (Fig. 5) is provided normally to maintain the jaw 64 in an unclamped position. In order to clamp the jaw 64 a slide bar 69 is slidably supported to the sleeve 32. The slide bar 69 is provided with a cam surface 70 which is arranged to engage the roller 67. When the bar 69 is moved toward the left (Figs. 2 and 7) the clamping jaw 64 is moved in a counterclockwise direction (Fig. 3) to clamp the crankshaft 15 in position. The cam 70 is so shaped that in a clamped position the clamping jaw 64 is positively locked to securely hold a crankshaft in said pot chuck. In order to actuate the slide bar 69, a rod 71 is fixably mounted thereto and is slidably supported within the sleeve 32. A compression spring 72 is provided normally to exert a pressure in a direction to move the bar 69 and cam 70 toward the left so as to actuate the clamp jaw 64 to clamp the crankshaft 15 within the pot chucks 13. An identical mechanism is provided within the work head 12 for actuating the clamping jaw of the pot chuck 14.

It is desired to provide a suitable hydraulic mechanism whereby if desired both of the clamping jaws may be unclamped synchronously so as to release a crankshaft 15 after a grinding operation has been completed. This mechanism may comprise hydraulic cylinder 75 which is supported by means of a bracket 76 on the work head 11. A piston 77 is slidably mounted within the cylinder 75. The piston 77 is provided with an integral piston rod 78, which is arranged in substantial alignment with the rod 71. A compression spring 79 normally serves to maintain the piston 77 in its left-hand end position (Fig. 2). When it is desired to unclamp the jaw 64, fluid under pressure is passed through a pipe 80 into a cylindrical chamber 81 to move the piston 77 toward the right (Fig. 2). This movement of the piston 77 causes the piston rod 78 to move into engagement with the rod 71 and to move it toward the right. The movement of the rod 71 toward the right serves to move the slide bar 69 also toward the right to shift the cam 70 so that the released compression of the spring 68 rocks the clamping jaw 64 in a clockwise direction to unclamp a crankshaft 15 supported in the pot chuck 13.

A similar hydraulic piston and cylinder mechanism is provided for the work head 12 to unclamp the pot chuck 14. This mechanism is identical with that just described and consequently has not been illustrated or described in detail. If desired, the two cylinders may be connected to a single control valve (not shown) so that both of the pot chucks may be unclamped or clamped simultaneously.

It is desirable to provide a rotary indexing mechanism for the pot chucks 13 and 14 so that the chucks may be readily indexed to position successive crankpins for grinding operations. This indexing mechanism may comprise an indexing plate 85 which is keyed on the left-hand end of the sleeve 32. The index plate 85 is provided with a pair of diametrically opposed notches 86 and 87 (Fig. 4). A slide bar 88 is provided with an elongated slot 89 which surrounds the projecting end of the rod 71. The bar 88 is slidably supported relative to plate 33 by means of a stud 90 and a diametrically opposed hollow stud 91 which are slidably supported in correspondingly shaped apertures formed in the plate 33. The stud 90 is provided with an integral index pawl 92 which is shaped to mate with the notches 86 and 87 in the index plate 85. A compression spring 93 within the hollow stud 91 normally serves to maintain the bar 88 in the right-hand end position (Fig. 4) with pawl 92 in engagement with the notch 86. When it is desired to index the pot chuck 13, the bar 88 is moved manually toward the left (Fig. 4) to move the pawl 92 out of engagement with the notch 86 after which the pot chuck 13 together with the sleeve 32 and the index plate 85 may be rotated relative to the end plates 33 and 34 to reposition the crankshaft 15 being ground. In the present case crankpins being ground are 180° apart, consequently the pot chuck 13, the sleeve 32 and the index plate 85 may be rotated 180° to position the notch 87 in alignment with the pawl 92 after which the bar 88 may be released and the release of the compression spring 93 moves the pawl 92 into operative engagement with the notch 87.

In order to facilitate the above indexing movement, a notch 94 is provided in the bar 88. A pivotally mounted latch 95 is mounted on the plate 33 so that when the bar 88 is moved to disengage the pawl 92, the latch 95 may be swung in a counterclockwise direction into engagement with the notch 94 so as to hold the bar 88 and the pawl 92 in a disengaged position during the index movement of the pot chuck 13. A similar index mechanism is provided for the work head 12. Since this mechanism is identical with that above described, it is not deemed necessary to illustrate and describe this indexing mechanism in detail.

If desired, a suitable work stop control mechanism may be provided to facilitate stopping the electric motor 17 so that the pot chucks 13 and 14 may be stopped always in an upright position such as that shown in Fig. 3. This work stop control mechanism may comprise a cam 96 which is supported on the collar 36. A follower roller 97 is slidably mounted so that it may be maintained in engagement with the cam 96. The cam and follower mechanism may be interconnected with an electrical control mechanism identical with that disclosed in the U. S. reissue Patent 20,127 to H. A. Silven, dated August 6, 1936, to which reference may be had for details of disclosure not contained herein.

The operation of this improved crank grinding machine will be readily apparent for the foregoing disclosure. In order to set the machine up for grinding a given crankshaft, the pot chucks 13 and 14 are first adjusted to position the sleeve 32 in the head 11, and the corresponding sleeve (not shown) in the head 12, so as to support the crankshaft 15 in a predetermined position with the crankpin to be ground arranged in axial alignment with the axis of rotation of the spindle 25. After both of the heads have been adjusted for crank throw, the pressure may be released within the hydraulic cylinders so as to release the compression of the springs 72 so as to clamp the opposite ends of the crankshaft 15 rigidly in position within the pot chucks 13 and 14. After the crankpins have been ground the sleeve 32 may be indexed in a manner above described to position the next pins in grinding position.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

I claim:

1. In a crankpin grinding machine having a work head, a rotatable spindle thereon, means to rotate said spindle, a pot chuck adjustably supported by said spindle, means rotarily to index said chuck relative to said spindle, and means including a gauging block having a plurality of gauging members, said gauge block being adjustably mounted on said head to facilitate adjustment of said chuck relative to said spindle in a radial direction normal to the spindle axis for grinding crankpins having different throws.

2. In a crankpin grinding machine having a work head, a rotatable spindle thereon, means to rotate said spindle, a pot chuck adjustably supported by said spindle, means including an index plate and a pawl to facilitate rotarily indexing said chuck relative to said spindle, and means including a gauge block having a plurality of gauging members, said gauge block being pivotally supported on said head to facilitate adjusting said chuck relative to said spindle in a radial direction normal to the spindle axis for grinding crankpins having different throws.

3. In a grinding machine having a work head, a hollow rotatable spindle therein, means to rotate said spindle, a disk-shaped plate adjustably mounted on each end of said spindle, a sleeve rotatably supported in said plates, a pot chuck on one end of said sleeve, means including a plurality of elongated slots in each of said plates, clamping screws passing through said slots and screw threaded into said spindle to facilitate adjusting said plates and said sleeve in a direction normal to the axis of said spindle, and means including a gauge block having a plurality of gauge members to facilitate adjusting and positioning said sleeve relative to said spindle for grinding crankpins having different throws.

4. In a crankpin grinding machine having a pair of spaced aligned work heads thereon, a hollow spindle rotatably mounted in each of said heads, an electric motor synchronously to rotate each of said spindles, a disk-shaped plate adjustably mounted on each of said spindles, a sleeve within each of said spindles which are rotatably supported by said plates, a pot chuck on adjacent ends of said sleeves to support the opposite ends of a work piece and an indexing mechanism including an index plate on each of said sleeves, and an index pawl supported by one of said plates on each of said spindles to facilitate indexing said sleeves relative to said spindles.

5. In a crankpin grinding machine having a pair of spaced aligned work heads thereon, a hollow rotatable spindle mounted in each of said heads, an electric motor synchronously to rotate each of said spindles, a disk-shaped plate adjustably mounted on each of said spindles, an eccentrically mounted sleeve within each of said spindles which is rotatably supported by said plates, a pot chuck on the adjacent ends of said sleeve to support the opposite ends of the work piece, and means including a rotatable turret-type gauge to adjust each of said plates relative to the spindle so as to facilitate adjusting the eccentricity of said sleeves and pot chucks relative to said spindle to grind crankpins having different throws.

6. In a crankpin grinding machine having a pair of spaced aligned work heads thereon, a hollow rotatable spindle mounted in each of said heads, an electric motor synchronously to rotate each of said spindles, a disk-shaped plate adjustably mounted on each of said spindles, an eccentrically mounted sleeve within each of said spindles which is rotatably supported by said plates, a pot chuck on the adjacent ends of said sleeves to support the opposite ends of the work piece, an index mechanism to facilitate indexing said sleeve relative to said spindles successively to position a plurality of crankpins in predetermined grinding positions, and means including a rotatable turret-type gauge to adjust each of said plates relative to the spindle so as to facilitate adjusting the eccentricity of said sleeves and pot chucks relative to said spindle to grind crankpins having different throws.

7. In a crankpin grinding machine having a pair of spaced aligned work heads thereon, a hollow rotatable work spindle in each of said heads, means including an electric motor synchronously to rotate both of said spindles, an eccentrically mounted sleeve within each of said spindles, a pot chuck on the adjacent ends of each of said sleeves to support the opposite ends of a work piece, said pot chucks including a V-shaped support and a pivotally mounted clamping jaw, a slidably-mounted spring-actuated cam on said sleeve to actuate said jaw, a fluid pressure piston and cylinder to actuate said cam to release said clamping jaw, and means to adjust the position of each of said sleeves in a direction normal to the spindle axis to facilitate grinding crankpins having different throws.

8. In a crankpin grinding machine having a pair of aligned work heads thereon, a hollow rotatable work spindle in each of said heads, means including an electric motor synchronously to rotate both of said spindles, an eccentrically mounted sleeve within each of said spindles, a pot chuck on adjacent ends of each of said spindles including a pivotally mounted clamping jaw, a slidably-mounted spring-actuated cam on said sleeve to actuate said jaw to clamp and positively lock a work piece in said chuck, a fluid pressure piston and cylinder to actuate said cam to release said clamping jaw, and means including a rotatable gauge block having a plurality of projecting gauge arms corresponding to the crankpin throws to be ground to facilitate adjusting the position of said sleeve in a direction normal to the spindle axis.

9. In a crankpin grinding machine having a pair of spaced aligned work heads thereon, a hollow rotatable work spindle in each of said heads, means including an electric motor synchronously to rotate both of said spindles, an eccentrically mounted sleeve within each of said spindles, a pot chuck on the adjacent ends of each of said sleeves to support the opposite ends of a work piece, said pot chucks including a work supporting member fixedly mounted relative to said sleeve and a pivotally mounted clamping jaw, means including a cam to actuate said jaw, a compression spring to move said cam in one direction to clamp said jaw, said cam being so shaped as to positively lock said jaw in a clamped position, and a fluid pressure piston and cylinder to move said cam in opposite directions to unclamp said jaw.

10. In a crankpin grinding machine having a pair of spaced aligned work heads thereon, a hollow rotatable work spindle in each of said heads, means including an electric motor synchronously to rotate both of said spindles, and adjustable eccentrically mounted sleeve within each of said spindles, a pot chuck on adjacent ends of each of said sleeves to support the opposite ends of a work piece, each of said pot chucks including a work supporting member fixedly mounted relative to said sleeves and a pivotally mounted clamping jaw, means including a spring-actuated cam to clamp and lock said jaw, a fluid pressure piston and cylinder to move said cam to unclamp said jaw, and means precisely to adjust the position of each of said sleeves relative to said spindles in a direction normal to the spindle axes to facilitate grinding crankpins having different throws.

ELPHEGE D. LA FLEUR.

REFERENCES CITED

The following references are of record in the file of this patent:

UNITED STATES PATENTS

| Number | Name | Date |
| --- | --- | --- |
| 855,320 | Landis | May 28, 1907 |
| 1,658,539 | Stoner | Feb. 7, 1928 |
| 2,113,388 | Silven et al. | Apr. 5, 1938 |
| 2,161,206 | Silven | June 6, 1939 |
| 2,343,949 | Bellinger | Mar. 14, 1944 |